US012572188B2

(12) United States Patent　　　　　　(10) Patent No.: US 12,572,188 B2
Reilly et al.　　　　　　　　　　　　　(45) Date of Patent:　　Mar. 10, 2026

(54) SUB-KELVIN TEMPERATURE GRADIENT SYSTEM FOR SCALABLE QUANTUM CONTROL

(71) Applicant: Microsoft Technology Licensing, LLC, Redmond, WA (US)

(72) Inventors: David J. Reilly, Sydney (AU); Ian Douglas Conway Lamb, Coogee (AU); Kushal Das, Kingsford (AU); Rachpon Kalra, Sydney (AU)

(73) Assignee: Microsoft Technology Licensing, LLC, Redmond, WA (US)

( * ) Notice: Subject to any disclaimer, the term of this patent is extended or adjusted under 35 U.S.C. 154(b) by 461 days.

(21) Appl. No.: 18/171,632

(22) Filed: Feb. 20, 2023

(65) Prior Publication Data

US 2024/0152189 A1　　　May 9, 2024

Related U.S. Application Data

(60) Provisional application No. 63/382,451, filed on Nov. 4, 2022.

(51) Int. Cl.
*G06F 1/20*　　　　　(2006.01)
(52) U.S. Cl.
CPC .................................... *G06F 1/206* (2013.01)
(58) Field of Classification Search
CPC ........... G06F 1/206; G06F 1/20; G06N 10/40; H01L 23/34; H04N 19/105; H04N 19/119;

(Continued)

(56) References Cited

U.S. PATENT DOCUMENTS

2009/0014714 A1*　1/2009　Koch ..................... B82Y 10/00
　　　　　　　　　　　　　　　　　　257/E39.012
2021/0326739 A1　10/2021　Jeffrey
(Continued)

FOREIGN PATENT DOCUMENTS

JP　　　2022154920 A　　10/2022

OTHER PUBLICATIONS

International Search Report and Written Opinion received for PCT Application No. PCT/US23/033671, mailed on Jul. 22, 2025, 17 pages.

(Continued)

*Primary Examiner* — Chun Cao
(74) *Attorney, Agent, or Firm* — Ranjeev Singh; Singh Law, PLLC

(57)　　　　　　ABSTRACT

Examples described in this disclosure relate to sub-kelvin control systems and methods for scalable quantum control. An example system includes a first cooling sub-system operable to maintain an operating temperature for a first device within a first sub-kelvin temperature range. The system further includes a second cooling sub-system, separate from the first cooling sub-system, operable to maintain an operating temperature for a second device, different from the first device, within a second sub-kelvin temperature range. The first sub-kelvin range may comprise a range between 50 milli-kelvin (mK) to 999 mK and the second sub-kelvin range may comprise a range between 1 mK to 299 mK. The combination of the first cooling sub-system and the second cooling sub-system is configured to maintain a temperature gradient between the first device and the second device despite the first device and the second device being in close proximity to each other.

20 Claims, 10 Drawing Sheets

(58) Field of Classification Search
CPC .... H04N 19/122; H04N 19/176; H04N 19/18;
H04N 19/625; H04N 19/70
USPC ........................................................ 700/300
See application file for complete search history.

(56) References Cited

U.S. PATENT DOCUMENTS

| | | | | |
|---|---|---|---|---|
| 2021/0402407 | A1* | 12/2021 | Hoehne | F25B 9/12 |
| 2023/0196177 | A1* | 6/2023 | Griffin | G06N 10/80 |
| | | | | 706/62 |
| 2023/0349624 | A1* | 11/2023 | Spallek | F25D 29/005 |

OTHER PUBLICATIONS

Otten, et al., "Qubit Bias using a CMOS DAC at mK Temperatures", 29th IEEE International Conference on Electronics, Circuits and Systems (ICECS, Oct. 24, 2022, 04 pages.

Savin, et al., "Thermal budget of superconducting digital circuits at subkelvin temperatures", Journal of applied physics, vol. 99, Issue 8, Apr. 21, 2006, 09 pages.

International Preliminary Report On Patentability received for PCT Application No. PCT/US23/033671, mailed on Jul. 31, 2025, 11 pages.

* cited by examiner

*600*

*650*

1000

SUB-KELVIN TEMPERATURE GRADIENT SYSTEM FOR SCALABLE QUANTUM CONTROL

CROSS-REFERENCE TO A RELATED APPLICATION

This application claims the benefit of U.S. Provisional Application No. 63/382,451, filed Nov. 4, 2022, titled "SUB-KELVIN TEMPERATURE GRADIENT SYSTEM FOR SCALABLE QUANTUM CONTROL" the entire contents of which are hereby incorporated herein by reference.

BACKGROUND

Controlling a quantum device requires generating a large number of static and dynamic voltage signals, and for quantum devices operating at cryogenic temperatures, the signals would ideally be generated at cryogenic temperatures in close integration with the quantum device. This is a major challenge given that the cryogenic environment strongly constrains power dissipation of any active electronics. In addition, a large number of voltage signals also need to be coupled to the quantum (qubit) gates' electrodes in the quantum computing device. As a result, potentially many thousands or millions of wires may need to be connected to the voltage or current sources for driving the qubit gates in the quantum computing device.

Moreover, conventionally qubits have been controlled with room temperature pulse generators that must generate large signals that are attenuated in the cryostat. The power needed to drive the large signals is attenuated by the cable impedance in the cryostat, which gets dissipated as heat, is an impediment to scaling quantum computers. In addition, the heat dissipation from the control circuitry used for controlling the qubits causes a major challenge with respect to thermal management. Accordingly, there is a need for better systems for integrating heat-dissipating control circuitry with qubit gates or other such sensitive devices.

SUMMARY

In one example, the present disclosure relates to a system including a first cooling sub-system operable to maintain an operating temperature for a first device within a first sub-kelvin temperature range. The system may further include a second cooling sub-system, separate from the first cooling sub-system, operable to maintain an operating temperature for a second device, different from the first device, within a second sub-kelvin temperature range. The first sub-kelvin range may comprise a range between 50 milli-kelvin (mK) to 999 mK and the second sub-kelvin range may comprise a range between 1 mK to 299 mK. A combination of the first cooling sub-system and the second cooling sub-system is configured to maintain a temperature gradient between the first device and the second device despite the first device and the second device being in close proximity to each other.

In another example, the present disclosure relates to a method of operating a system, including using a first cooling sub-system, maintaining an operating temperature for a first device within a first sub-kelvin temperature range. The method may further include using a second cooling sub-system, separate from the first cooling sub-system, maintaining an operating temperature for a second device, different from the first device, within a second sub-kelvin temperature range. The first sub-kelvin range may comprise a range between 50 milli-kelvin (mK) to 999 mK and the second sub-kelvin range may comprise a range between 1 mK to 299 mK. The method may further comprise using a combination of the first cooling sub-system and the second cooling sub-system, maintaining a temperature gradient between the first device and the second device despite the first device and the second device being in close proximity to each other.

In yet another example, the present disclosure relates to a system including a heat-dissipating device configurable to operate within a first sub-kelvin temperature range. The system may further include a sensitive device coupled to the heat-dissipating device via an interposer, where the sensitive device is arranged in close proximity to the heat-dissipating device, and where the sensitive device is configurable to operate within a second sub-kelvin temperature range lower than the first sub-kelvin temperature range. The system may further include a first cooling sub-system coupled to the heat-dissipating device for maintaining an operating temperature within the first sub-kelvin temperature range.

The system may further include a second cooling sub-system, separate from the first cooling sub-system, coupled to the interposer for maintaining an operating temperature of the interposer within a third sub-kelvin temperature range between the first sub-kelvin range and the second sub-kelvin temperature range. The system may further include a third cooling sub-system, separate from the first cooling sub-system and the second cooling sub-system, coupled to the sensitive device for maintaining an operating temperature within the second sub-kelvin temperature range such that a combination of the first cooling sub-system, the second cooling sub-system, and the third cooling sub-system is configured to maintain a temperature gradient between the heat-dissipating device and the sensitive device despite being in close proximity to each other.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying FIGURES, in which like references indicate similar elements. Elements in the FIGURES are illustrated for simplicity and clarity and have not necessarily been drawn to scale.

DETAILED DESCRIPTION

Figure 1:
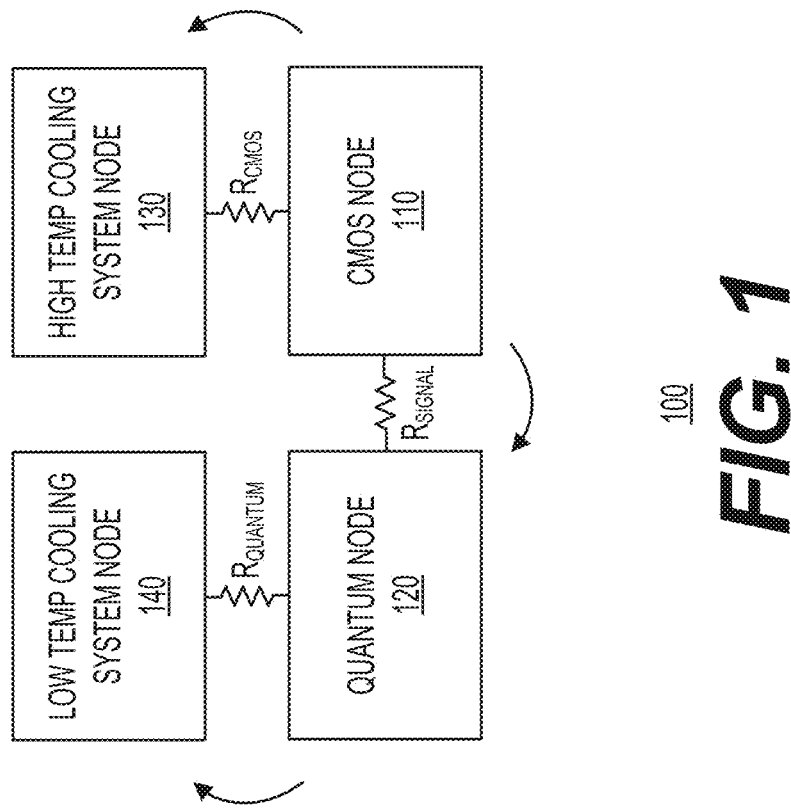
FIG. 1 shows a thermal-resistance model of a sub-kelvin control system for scalable quantum control including a heat-dissipating device and a sensitive device with a thermally resistive interconnect in accordance with one example.

The present disclosure proposes a sub-kelvin control system for scalable quantum control. This is achieved by using a cryogenic cooling architecture and thermal management approach that allows one to operate sensitive electrical devices (e.g., qubits), which require low temperature, in close proximity to heat-dissipating control devices (e.g., control circuitry for controlling the qubits). The close proximity between the two devices can be achieved by attaching the devices to a shared structure (e.g., an interposer) resulting in the two devices being co-located in close physical proximity to each other. As used herein, the term "close proximity" between two devices refers to any arrangement of the two devices such that they are physically located within 5-100 mm of each other or when the devices are mounted on an interposer or interconnected via lithographically defined wires. The devices are interconnected via thermally-resistive interconnects that, while allowing for electrical connection between the two devices, also significantly limit the allowed transmission of heat from the heat-dissipating device to the sensitive device.

To ensure proper operation of the sensitive device at a low temperature, the sub-kelvin control system for scalable quantum control includes several improvements over the conventional systems. As part of the sub-kelvin control system for scalable quantum control, significant improvements over conventional systems are achieved by cooling the sensitive devices with one cooling system and cooling the other electrical devices with another cooling system and physically connecting the two devices using an insulating mechanical substrate and thermally insulating electrical connections. Optionally, to achieve higher thermal insulation, the two devices may be connected via a capacitive coupling or an inductive coupling. Cooling systems may include a dilution refrigerator, a pumped helium-3 refrigerator, or a pumped helium-4 refrigerator. The two devices may be adjacent to each other (e.g., on a thermally resistive multi-chip module (MCM)), stacked on each other (with a thermally resistive substrate in the stack), or arranged in a combination of the two aforementioned approaches.

One type of control architecture for sensitive devices (e.g., the qubit plane) includes an integrated circuit control chip, containing cryogenic control circuits, which is tightly integrated with the sensitive devices (e.g., the qubit plane). The control chip can store a charge on a capacitor (that includes the interconnect capacitance) to generate a voltage bias. One or more digital to analog converters may be used to set the charge on each capacitor, which at cryo-temperatures remains for a long time on account of the extremely low leakage pathways at these temperatures. Refresh of the charge can be made cyclically on a timescale commensurate with qubit operation. The capacitance may be reduced as much as possible by arranging the cryogenic-CMOS control chip and the qubit plane in close proximity to each other. The close proximity achieved, for example via chip-stack packaging approaches or other multi-chip module packaging approaches, can reduce the capacitance, thereby reducing the dissipated power.

The qubit plane may include topological quantum bits (qubits) or other solid-state qubits that may be required to operate below a temperature of 300 milli-kelvin (e.g., at approximately 20 milli-kelvin (~20 mK)). The quantum computing devices may process quantum information. A qubit may be implemented using various physical systems, including photons, electrons, Josephson junctions, quantum dots, or heterostructures. The quantum state(s) may be encoded as a direction of spin, another aspect of spin, charge, energy, or excitation stages as part of a qubit, or a topological phase of superconducting matter. The example qubits may operate based on either low-frequency DC signals (e.g., bias voltages or currents) or high-frequency radio frequency signals (e.g., 1 GHz or 10 GHz signals) or based on a combination of both. In certain examples, microwave signals may be used to control the superconducting devices, including, for example, the state of the quantum bits (qubits). Certain implementations of the gates for quantum bits (qubits) may require high-frequency microwave signals. The qubits may be read out using frequency multiplexing.

As explained earlier, controlling large numbers of qubits presents a major challenge because of the IO-density bottleneck and the associated heat dissipated by the control circuitry. While the control chip operating largely proximal to the qubits addresses this challenge, these chips also dissipate some heat at milli-kelvin temperatures where cooling power is negligible.

As an example, the heat-dissipating device may be a digital device, an analog device, or a combination thereof, including analog-to-digital converters (ADCs), digital-to-analog converters (DACs), digital signal processors (DSPs), and field-programmable gate arrays (FPGAs). The heat-dissipating device may be implemented using various semiconductor technologies, including complimentary metal-oxide-semiconductor (CMOS), silicon-germanium (SiGe), or any of the III-V compound semiconductors. Heat-dissipating devices may also include single-flux quantum (SFQ)-based electronic circuits, including rapid single flux quantum (RSFQ) circuits, reciprocal quantum logic (RQL) circuits, or variations thereof. Heat-dissipating devices may further include passive circuits, voltage dividers, capacitors, resistors, interconnect structures, and other circuits/structures. Sensitive devices may include qubit devices with quantum dots, tunable junctions, and gates to manipulate the quantum dots and the tunable junctions. Qubit devices may include topological qubits or other types of qubits. As noted earlier, a qubit may be implemented using various physical systems, including photons, electrons, Josephson junctions, quantum dots, or heterostructures. The quantum state(s) may be encoded as a direction of spin, another aspect of spin, charge, energy, or excitation stages as part of a qubit, or a topological phase of superconducting matter.

Conventional cooling approaches for a combination of such systems employ a single dilution refrigerator. In contrast, the sub-kelvin control system for scalable quantum control proposed herein engineers a temperature and cooling power differential via two separate cooling systems (e.g., dilution refrigerators)—one for the sensitive electrical devices (e.g., qubits) and a second one for the proximate heat-dissipating control devices (e.g., control circuitry for controlling the qubits). Independently cooling each of the heat-dissipating device and the sensitive device with their own cooling systems is distinct from a simple arrangement of two (or more) dilution refrigerators operating in parallel to simply increase cooling power for the two devices. As part of this approach to thermal management, a thermally-insulating interposer provides a new means of electrically connecting heat generating circuits to the ultra-cold qubits, while thermally isolating the two from each other. In sum, the approach disclosed herein makes use of two independent dilution refrigerators that operate in close proximity to each other. One of the dilution refrigerators is optimized to achieve a temperature range for the quantum plane (e.g., <100 mK), but with limited cooling power. The other dilution refrigerator is optimized for large cooling power at an elevated temperature (e.g., few 100s of mK). Optimization of the independent dilution refrigerators is achieved via design of the heat exchangers, mixing chamber morphology, flow impedance, the ratio of 3He and 4He, and the mixture flow rate.

FIG. 1 shows a thermal-resistance model 100 of a sub-kelvin control system for scalable quantum control including a heat-dissipating device and a sensitive device with a thermally resistive interconnect. Each resistor ($R_{SIGNAL}$, $R_{QUANTUM}$, and $R_{CMOS}$) in this thermal-resistance model represents a certain amount of thermal resistance and the current flowing through the resistor can be viewed as the amount of heat flowing through the resistor. The thermal-resistance model further includes a node labeled as high temp cooling system node 130 and another node labeled as low temp cooling system node 140. In this model, the node labeled as CMOS node 110 corresponds to the temperature of a heat-dissipating device (e.g., control circuitry for controlling qubits) and the other node labeled as quantum node 120 corresponds to the temperature of a sensitive device (e.g., a qubits plane). The two devices are placed in close proximity to each other and are coupled via a thermally resistive interconnect, and each device is connected to its respective cooling system by a thermally conductive path. To minimize the temperature of the quantum node 120, the thermal resistance of the interconnect ($R_{SIGNAL}$) should be maximized, while the thermal resistance of the cooling paths ($R_{QUANTUM}$ and $R_{CMOS}$) should be minimized. Despite there being a large temperature gradient between the CMOS node 110 and the quantum node 120, most of the heat dissipated by the CMOS node 110 (corresponding to the heat-dissipating device) flows to the high temp cooling system node 130. Only a small fraction of the heat dissipated by the CMOS node 110 flows to the quantum node 120, and by conservation of current in the steady state, that same small amount of heat flows from the quantum node 120 (e.g., corresponding to the sensitive device) to the low temp cooling system node 140. Although not shown in FIG. 1, there could be multiple temperature stages and cooling systems associated with the active electronics used for controlling the sensitive device, with the lowest-power dissipating electronics closest to the sensitive device.

Figure 2:
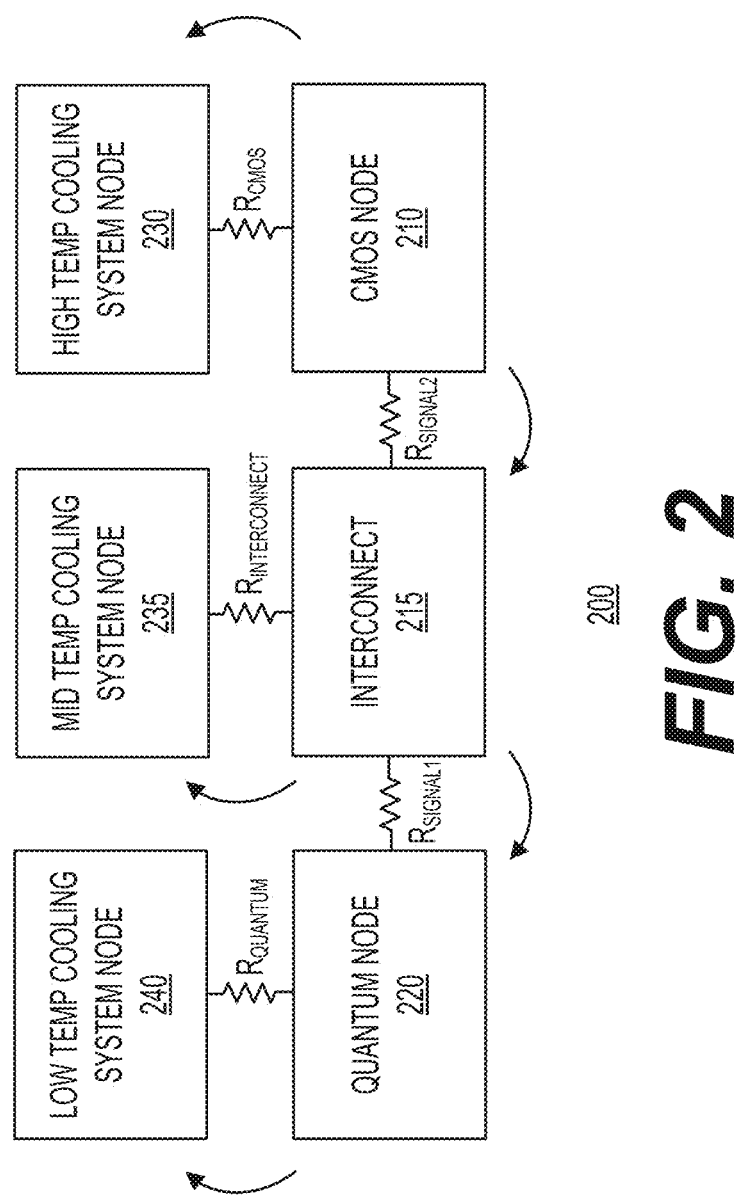
FIG. 2 shows another thermal-resistance model of a sub-kelvin control system for scalable quantum control including a heat-dissipating device and a sensitive device with three cooling systems in accordance with one example.

FIG. 2 shows another thermal-resistance model 200 of a sub-kelvin control system for scalable quantum control including a heat-dissipating device and a sensitive device with three cooling systems. This model relates to a system in which multiple temperature stages and cooling systems can be used to minimize the temperature of the coldest stage. Each resistor ($R_{SIGNAL1}$, $R_{SIGNAL2}$, $R_{QUANTUM}$, $R_{INTERCONNECT}$, and $R_{CMOS}$) in this thermal-resistance model represents a certain amount of thermal resistance and the current flowing through the resistor can be viewed as the amount of heat flowing through the resistor. The thermal-resistance model further includes a node labeled as high temp cooling system node 230, another node labeled as mid temp cooling system node 235, and yet another node labeled as low temp cooling system node 240. In this model, the node labeled as CMOS node 210 corresponds to the temperature of a heat-dissipating device (e.g., control circuitry for controlling qubits) and the other node labeled as quantum node 220 corresponds to the temperature of a sensitive device (e.g., a qubits plane). These two nodes are coupled with a node labeled as interconnect node 215. The two devices are placed in close proximity to each other, and each device is connected to its respective cooling system by a thermally conductive path. To minimize the temperature of the quantum node 220, the thermal resistance of the interconnects ($R_{SIGNAL1}$, $R_{SIGNAL2}$, and $R_{INTERCONNECT}$) should be maximized, while the thermal resistance of the cooling paths ($R_{QUANTUM}$ and $R_{CMOS}$) should be minimized. Despite there being a large temperature gradient between the CMOS node 210 and the quantum node 220, most of the heat dissipated by the CMOS node 210 (corresponding to the heat-dissipating device) flows to the high temp cooling system node 230. Some of the heat flows to the interconnect node 215, a portion of which flows to the mid temp cooling system node 235. In this manner, only a small fraction of the heat dissipated by the CMOS node 210 flows to the quantum node 220, and by conservation of current in the steady state, that same small amount of heat flows from the quantum node 220 (e.g., corresponding to the sensitive device) to the low temp cooling system node 240. Although not shown in FIG. 2, there could be multiple temperature stages and cooling systems associated with the active electronics used for controlling the sensitive device, with the lowest-power dissipating electronics closest to the sensitive device.

With continued reference to FIG. 2, the interconnect node 215 corresponds to an insulating interface between the CMOS node 210 and the quantum node 220, which allows the devices corresponding to these nodes to be placed close to each other. The two devices may be electrically coupled using an ultra-low thermal conductivity material, for example Macro ceramic with thin superconducting (e.g., niobium) wires patterned lithographically on its surface. This niobium on Macor interconnect may be implemented as a multichip module interposer between the quantum plane and the control circuitry. Other types of ceramics, high resistance semiconductors, glasses, and plastics may also be used to implement interposers or other similar structures for interconnecting the quantum plane and the control circuitry.

Figure 3:
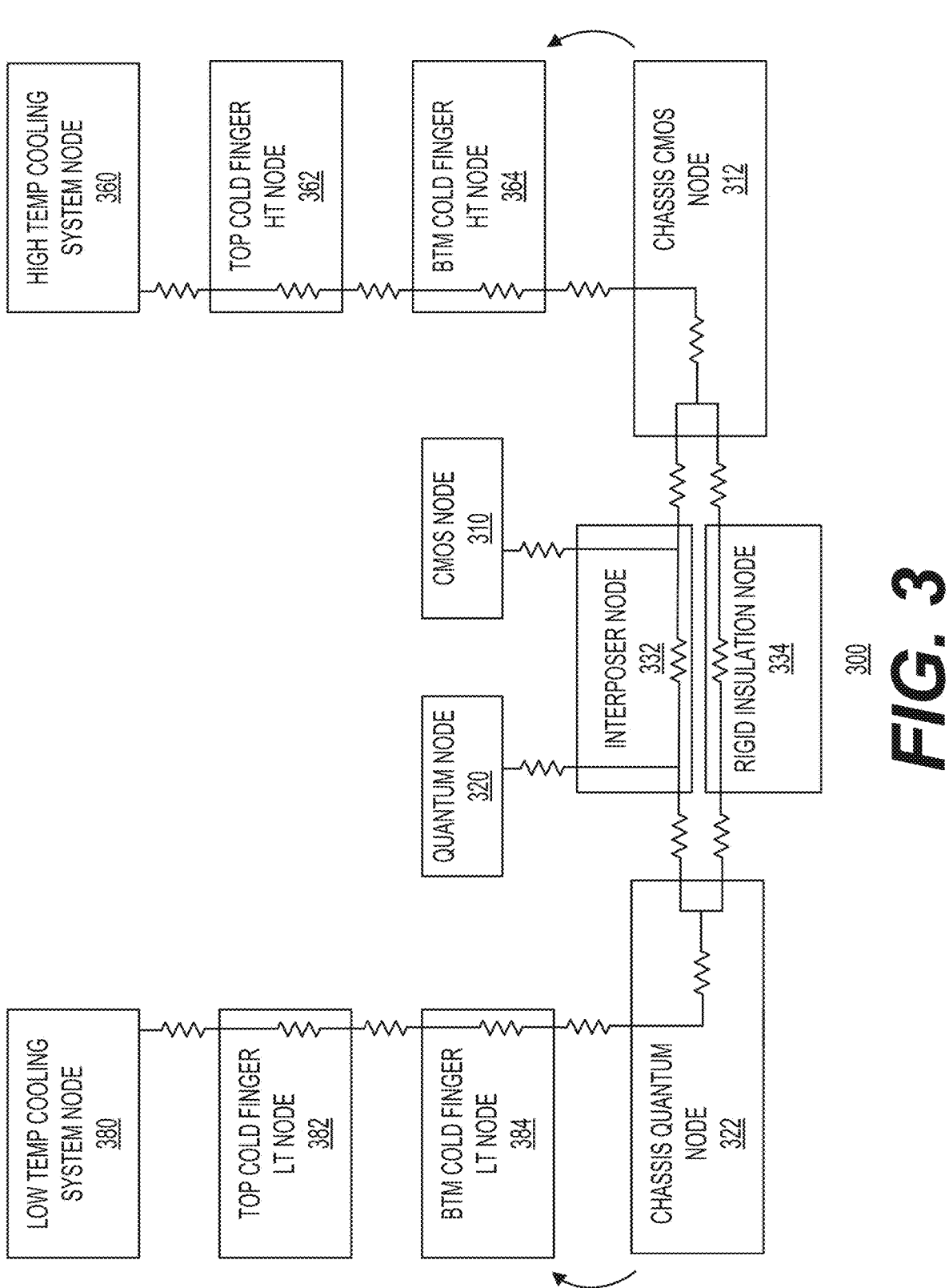
FIG. 3 shows a more complex thermal-resistance model of a sub-kelvin control system for scalable quantum control including a heat-dissipating device and a sensitive device and other nodes in accordance with one example.

FIG. 3 shows a more complex thermal-resistance model 300 of a sub-kelvin control system for scalable quantum control including a heat-dissipating device and a sensitive device and other nodes. In this model, the box labeled as CMOS node 310 corresponds to the temperature of a heat-dissipating device (e.g., control circuitry for controlling qubits) and the other box labeled as quantum node 320 corresponds to the temperature of a sensitive device (e.g., a qubits plane). The two devices and respective cooling dilution refrigerators for the devices are placed in close proximity to each other, and each device is connected to its respective cooling system by a thermally conductive path. Similar to the previously described thermal-resistance model, each resistor in this thermal-resistance model represents a certain amount of thermal resistance and the current flowing through the resistor can be viewed as the amount of heat flowing through the resistor. The resistances between the nodes represent thermal contact resistance (TCR) between two objects pressed or otherwise connected together. The resistances inside the nodes represent the bulk thermal resistance of each physical component in the system. The thermal-resistance model further includes a box labeled as interposer node 332 and another box labeled as rigid insulation node 334. An ultra-low thermal conductivity material, for example Macor ceramic, with thin superconducting (e.g., niobium) wires patterned lithographically on its surface, may be used for the structure corresponding to the rigid insulation and the interposer, respectively.

With continued reference to FIG. 3, in this model, the thermal-resistance model further includes a box labeled as the chassis CMOS node 312 (e.g., corresponding to a chassis for housing or otherwise supporting the heat-dissipating devices being cooled) and another box labeled as chassis quantum node 322 (e.g., corresponding to a chassis for housing or otherwise supporting the sensitive device). The chassis may include cold plates that conduct the heat from a respective device and the interposer to the next adjacent node in the thermal-resistance model. As explained later, in terms of the physical arrangement of the heat-dissipating device and the sensitive device, they may be arranged in several different ways. The thermal-resistance model further includes a box labeled as high temp cooling system node 360 and another box labeled as low temp cooling system node 380. The chassis CMOS node 312 is shown as coupled to the high temp cooling system node 360 via two other nodes: the top cold finger high-temperature (HT) node 362 and the bottom (btm) cold finger HT node 364. The top cold finger HT node 362 and the btm cold finger HT node 364 correspond to intermediate cold structures used as a cooling path between the high temp cooling system node 360 (e.g., the mixing chamber, in the case of a dilution refrigerator being used as the cooling system) and the chassis CMOS node 312. These nodes correspond to a cooling apparatus that could be used to provide a thermal hierarchy from the chassis CMOS node 312 to the high temp cooling system node 360.

The chassis quantum node 322 is shown as coupled to the low temp cooling system node 380 via two other nodes: the top cold finger low-temperature (LT) node 382 and the bottom (btm) cold finger LT node 384. The top cold finger LT node 382 and the btm cold finger LT node 384 correspond to intermediate cold structures used as a cooling path between the low temp cooling system node 380 (e.g., the mixing chamber, in the case of a dilution refrigerator being used as the cooling system) and the chassis quantum node 322. These nodes correspond to a cooling apparatus that could be used to provide a thermal hierarchy from the chassis quantum node 322 to the low temp cooling system node 380.

Despite there being a large temperature gradient between the CMOS node 310 and the quantum node 320, most of the heat dissipated by the CMOS node 310 (corresponding to the heat-dissipating device) flows to the high temp cooling system node 360. Some of the heat flows to the interposer node 332, a small portion of which flows to the low temp cooling system node 380. The presence of additional nodes between interposer node 332 and low temp cooling system node 380 ensures that such heat flow is minimal. In this manner, only a fraction of the heat dissipated by the CMOS node 310 flows to the quantum node 320, and by conservation of current in the steady state, that same small amount of heat flows from the quantum node 320 (e.g., corresponding to the sensitive device) to the low temp cooling system node 380. Although not shown in FIG. 3, there could be multiple temperature stages and cooling systems associated with the active electronics used for controlling the sensitive device, with the lowest-power dissipating electronics closest to the sensitive device.

Although the thermal-resistance models shown in FIGS. 1, 2, and 3 refer to the nodes corresponding to the devices as the CMOS node and the quantum node, the devices corresponding to these nodes are not limited to these specific technologies. As explained earlier any number of different technologies and combinations thereof may be used to implement the heat-dissipating device. Similarly, as explained earlier, any number of different technologies and combinations thereof may be used to implement the sensitive device. In addition, although each of the thermal-resistance models shown in FIG. 1 and FIG. 2 depict only one low temp node and one high temp node, each of the heat-dissipating device and the quantum device may be coupled to two or more high temp nodes and low temp nodes, respectively. Such nodes may be implemented using additional dilution refrigerators or other cooling mechanisms. In addition, as noted earlier, optimization of the independent cooling systems is achieved via design of the heat exchangers, mixing chamber morphology, flow impedance, the ratio of 3He and 4He, and the mixture flow rate. As an example, the design of the high temp cooling system can trade off base temperature for enhanced cooling power (at an elevated temperature). The heat exchanger design can accommodate larger helium (He) flow rates than conventional dilution fridges—leading to an increase in the base temperature above 100 mK but enabling more cooling power at those elevated temperatures.

Figure 4:
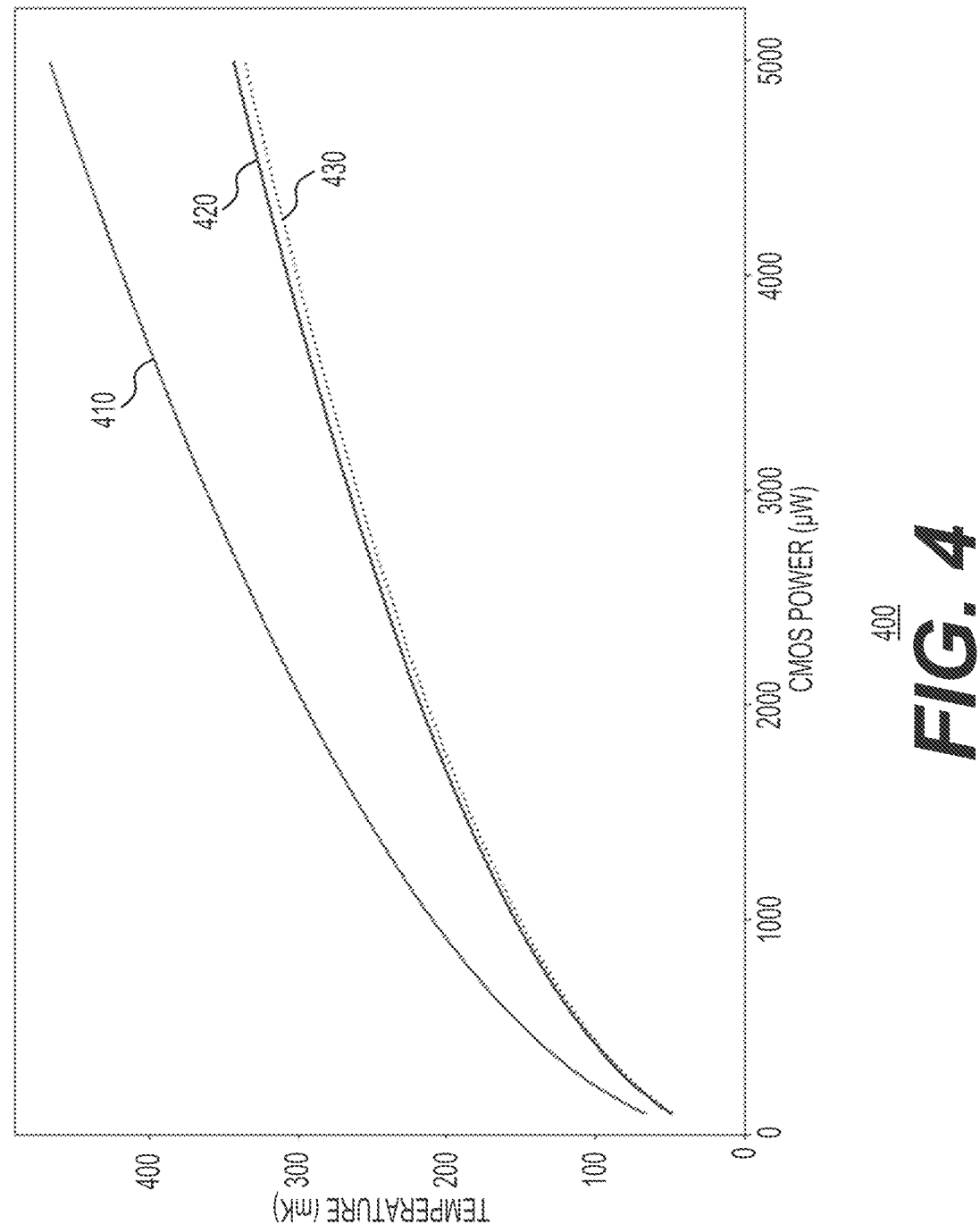
FIG. 4 shows a graph generated by simulating a modification of the thermal-resistance model of a system that instead of having two cooling systems, has a single shared dilution refrigerator that is connected to the top of the cooling paths of both the heat-dissipating control device and the sensitive device.

FIG. 4 shows a graph 400 generated by simulating a modification of the thermal-resistance model of a system that instead of having two cooling systems, has a single shared dilution refrigerator that is connected to the top of the cooling paths of both the heat-dissipating control device and the sensitive device. The vertical axis of the graph below corresponds to the temperature of nodes in the thermal-resistance model of the conventional system. The horizontal axis of the graph in FIG. 4 corresponds to power dissipation of the heat-dissipating control device. Curve 410 corresponds to the nodes related to the heat-dissipating control device (e.g., control circuitry for controlling qubits), curve 420 corresponds to the nodes related to the sensitive device (e.g., a qubit plane), and curve 430 corresponds to the temperature of the dilution unit.

Curves 410, 420, and 430 are generated by solving a set of equations representing the steady-state of the thermal model in FIG. 3 as part of which the cooling system is modelled as an approximation of a dilution refrigerator where the cooling power increases quadratically as a function of temperature at that node, assuming there is 400 μW of cooling power when that node is at 100 mK. Moreover, each bulk thermal resistance is modelled as a function which returns heat flow for given temperatures at each end, based on the geometry and material of the structure. In addition, each thermal contact resistance is modelled as a function which returns heat flow for given temperatures at each end, based on the bulk materials and plating materials of each structure, and the surface area and clamping force between them for the case of clamped interfaces in this model (other functions could be used for other types of attachment such as brazing or welding). For each value in a sweep of the power dissipation up to 5000 μW (5 mW), the appropriate values of temperature are determined such that the heat flow solves Kirchhoff's current law and Kirchhoff's voltage law, in the analogy that voltage is treated as temperature and current is treated as heat flow. Radiation is ignored in this model, which is a reasonable approximation at these very low temperatures where radiation is small. Convection is also ignored which is reasonable in this model since it is intended to be used with a high vacuum.

As shown in FIG. 4, the power dissipation of the heat-dissipating device is approximately 107 μW when the quantum node is at 50 mK. As evident from FIG. 4, the thermal isolation between the two devices and the separate cooling paths allow the temperature of the sensitive device to be much closer to the temperature of the dilution unit than the temperature of the heat-dissipating device is to the temperature of the dilution unit since much less heat is flowing from the sensitive device to the dilution unit than from the heat-dissipating device to the dilution unit. However, as the power dissipation of the heat-dissipating control device increases, the temperature of the shared dilution refrigerator increases significantly (shown by curve 430). So, despite the small temperature gradient between the dilution unit and the sensitive device, the heat dissipated by the control device sets a low power dissipation limit to maintain the temperature of the sensitive device below any required temperature limits (e.g., 50 mK).

Figure 5:
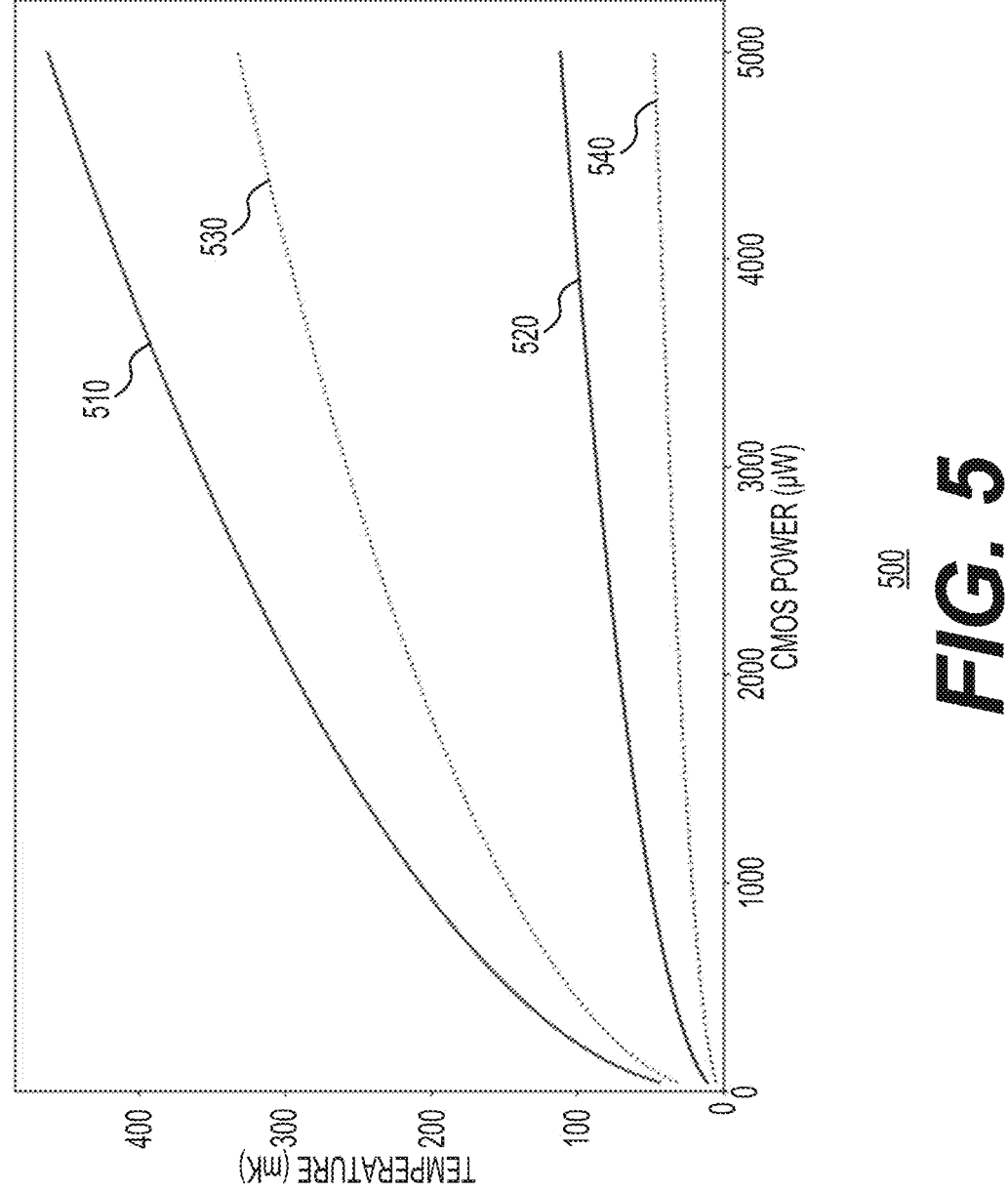
FIG. 5 shows a graph corresponding to the thermal-resistance model of FIG. 3 corresponding to a sub-kelvin control system for scalable quantum control including a heat-dissipating device and a sensitive device with separate and independent dilution refrigerators.

FIG. 5 shows a graph 500 corresponding to the thermal-resistance model of FIG. 3 of a sub-kelvin control system for scalable quantum control including a heat-dissipating device and a sensitive device with separate and independent dilution refrigerators. The vertical axis of the graph below corresponds to the temperature of the quantum node in a thermal-resistance model of the sub-kelvin control system. The horizontal axis of the graph below corresponds to power dissipation of the heat-dissipating control device. Curve 510 corresponds to the nodes related to the heat-dissipating control device (e.g., control circuitry for controlling qubits), curve 520 corresponds to the nodes related to the sensitive device (e.g., a qubit plane), curve 530 corresponds to the temperature of the CMOS dilution unit, and curve 540 corresponds to the temperature of the quantum dilution unit. Curves 510, 520, 530, and 540 are generated by creating a thermal-resistance model of the sub-kelvin control system for scalable quantum control that captures the thermal behavior of the system. As explained earlier (e.g., with respect to FIG. 3), such a model includes nodes and the thermal resistance between the nodes. By sweeping the power dissipation of the heat-dissipating control device with respect to the thermal-resistance model, the curves shown below can be generated. The difference between the graphs shown in FIG. 4 and FIG. 5 is that the graph in FIG. 5 models the cooling systems as two separate dilution refrigerators, exactly as shown in FIG. 3, while the graph in FIG. 4 models a system with just a single dilution refrigerator.

As shown above in FIG. 5, only when the power dissipation of the heat-dissipating device is greater than 1,022 μW does the temperature associated with the quantum node reach 50 mK. As the power dissipation of the heat-dissipating control device increases, the temperature of the quantum dilution unit (shown by curve 540) increases much more slowly than that of the CMOS dilution unit (shown by curve 530). Thus, the use of separate and independent refrigeration units in combination with the thermal insulation between the heat-dissipating device and the sensitive device provides better thermal management even when the two devices are proximal to each other. Similar thermal management can be achieved for other combinations of heat-dissipating electrical devices and sensitive devices when arranged as part of the sub-kelvin control system for scalable quantum control.

Figure 6A:
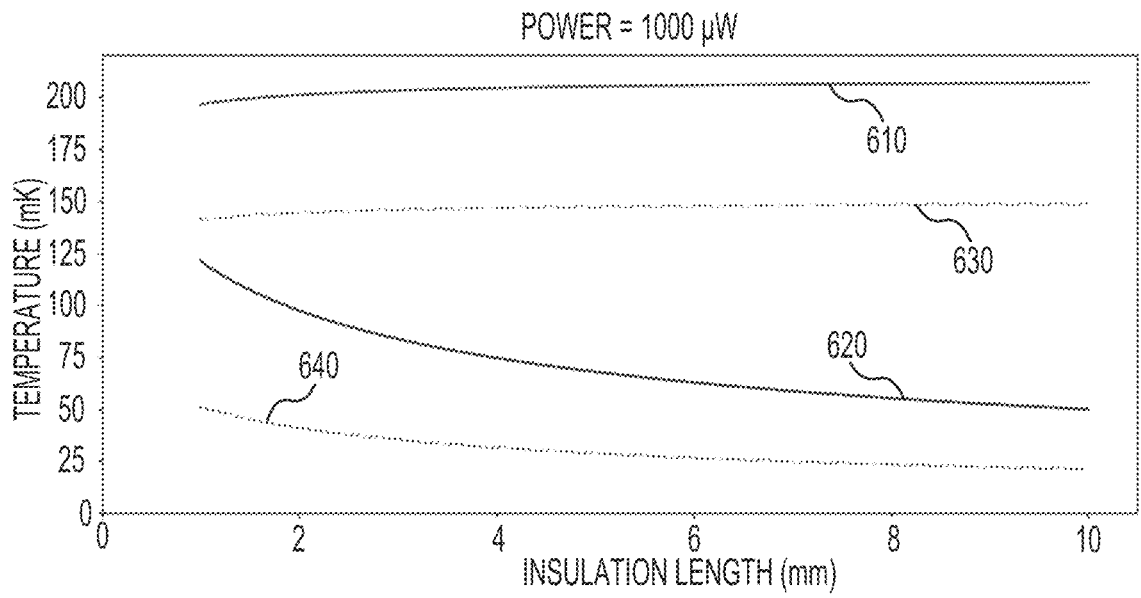
FIG. 6A shows a graph with the temperature of the various nodes in the thermal-resistance model of FIG. 3 as the length of the insulating interposer between the heat-dissipating control device and the sensitive device is varied.

FIG. 6A shows a graph 600 with the temperature of the various nodes in the thermal-resistance model of FIG. 3 as the length of the insulating interposer between the heat-dissipating control device (e.g., the CMOS device) and the sensitive device (e.g., the qubit plane) is varied. The vertical axis of the graph corresponds to the temperature of the various nodes and the horizontal axis corresponds to the length of the wires that interconnect the heat-dissipating control device with the sensitive device. Curve 610 shows the temperature of the CMOS device as the length of the insulating interposer is varied. Curve 620 shows the temperature of the quantum device as the length of the insulating interposer is varied. Curve 630 shows the temperature of the CMOS dilution unit as the length of the insulating interposer is varied. Curve 640 shows the temperature of the quantum dilution unit as the length of the insulating interposer is varied. As explained earlier, very thin electrical interconnects can be used to transfer control signals from the heat-dissipating control device to the sensitive device being controlled. Superconducting interconnects can further limit the thermal conductivity of the electrical connections.

Figure 6B:
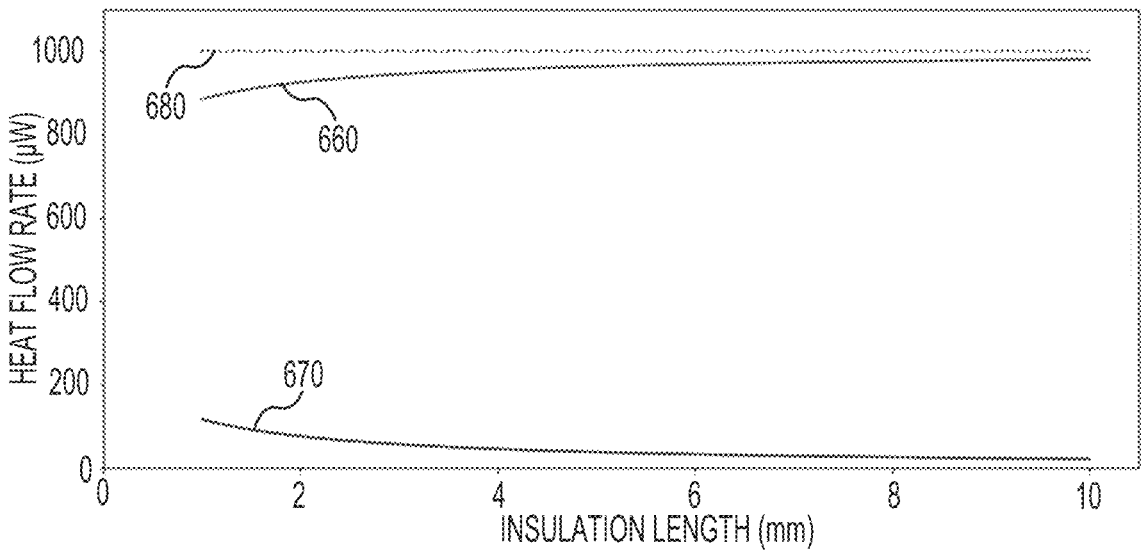
FIG. 6B shows a graph of the total dissipation of the heat-dissipating control device and the sensitive device as the length of the insulating interposer between the heat-dissipating control device and the sensitive device is varied.

FIG. 6B shows a graph 650 of the total dissipation of the heat-dissipating control device (e.g., the CMOS device) and the sensitive device (e.g., the qubit plane) as the length of the insulating interposer between the heat-dissipating control device and the sensitive device is varied. FIG. 6B shows that the increased thermal resistance from increased length lowers the fraction of the heat which flows to the sensitive device. Curve 660 shows the heat flow rate to the CMOS dilution unit as the length of the insulating interposer is varied. Curve 670 shows the heat flow rate to the quantum dilution unit as the length of the insulating interposer is varied. Curve 680 shows the total dissipation of heat as the length of the insulating insulator is varied. Another method of limiting the heat flowing to the sensitive device is to lower the thermal resistance of the path from the sensitive device to its cooling system, or to lower the thermal resistance of the path from the heat-dissipating control device to its cooling system.

Figure 7:
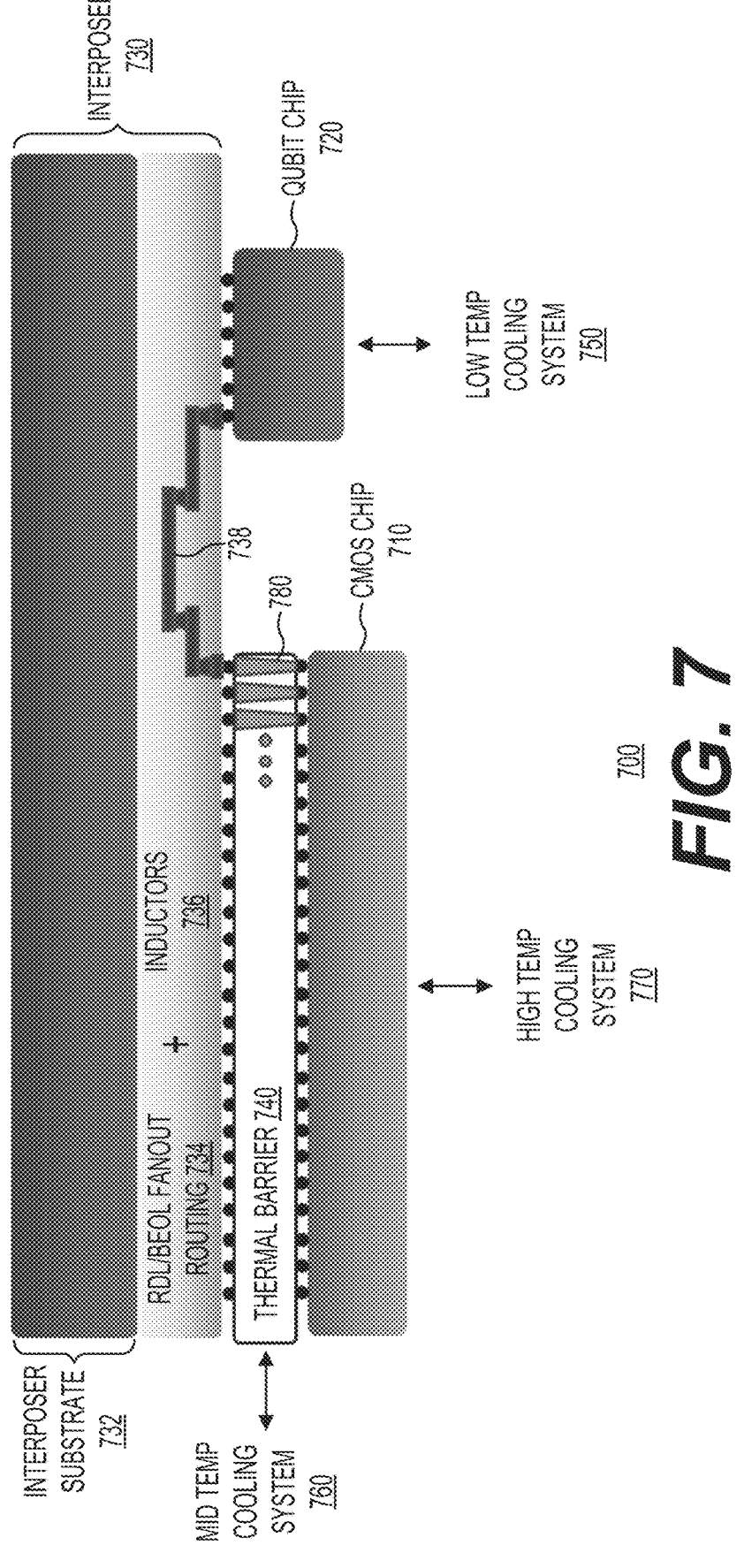
FIG. 7 shows a diagram of an example sub-kelvin control system for scalable quantum control using a thermally resistive multi-chip module (MCM) to separate a heat-dissipating device from a sensitive device.

FIG. 7 shows a diagram of an example sub-kelvin control system for scalable quantum control using a thermally resistive multi-chip module (MCM) 700 to separate a heat-dissipating device from a sensitive device. The MCM 700 allows the assembly of a packaged integrated circuit corresponding to the heat-dissipating device (labeled as CMOS chip 710 in FIG. 7) with a packaged integrated circuit corresponding to the sensitive device (labeled as qubit chip 720 in FIG. 7). In this MCM 700, the two chips are located on the same side of an interposer 730. In addition, a thermal barrier 740 is arranged between the interposer 730 and the heat-dissipating device (CMOS chip 710). As shown in FIG. 7, separate cooling systems (a low temp cooling system 750, a mid temp cooling system 760, and a high temp cooling system 770) are used for cooling each of the heat-dissipating device (CMOS chip 710), the sensitive device (qubit chip 720), and the thermal barrier 740. Each of the low temp cooling system 750, the mid temp cooling system 760, and the high temp cooling system 770 may comprise a dilution refrigerator, a pumped helium-3 system, or a pumped helium-4 system.

CMOS chip 710 may be packaged as a ball-grid array package such that it can be bonded via the ball-grid array to the thermal barrier. Alternatively, die-bonding techniques such as flip-chip bump-bonding may also be used. As shown in FIG. 7, through-silicon vias (TSVs) 780 may be used to interconnect signals from the control circuitry within the CMOS chip 710 to the additional contacts on the bottom surface of the thermal barrier 740, which is coupled to the top surface of the interposer 730. Additional TSVs or vias may be formed to further connect the signal pathways through the interposer substrate 732 to a redistribution layer (RDL) and backend of the line (BEOL) fanout routing 734. The RDL may be configured as one or more extra layers of wiring to make the chip-to-chip bonding simpler. Moreover, the bottom portion of the interposer 730 may further include inductors 736 that may be used as resonators. Signal pathways 738 may be routed onwards to the qubits in the qubit chip 720. Depending on the number of qubits in the qubit chip 720, which may require up to 10s of wires per qubit, the RDL and the BEOL processes may include a large number of layers (e.g., 50-100 layers) of metallization. The wires may be formed using niobium titanium nitride (NbTiN). Lithographic processes allow for the wires to be tens of nanometers thick, and in the nanometer to micrometer range in width, minimizing cross-section to minimize thermal conductivity. The substrate material may be a material with an extremely low thermal conductivity at millikelvin temperatures, such as a ceramic material like Macor. The substrate may also be kept extremely thin to minimize thermal conductivity, for example, it may be formed with very thin polyimide layers. Substrate material, width, thickness, and geometry can be varied to control the amount of insulation; phonon-engineered structures may also be used to limit phonon propagation and increase the insulation; electrical conductor material, width and thickness, and the total number of signal lines can be used to control the contribution of the electrical signal path to the overall thermal conduction.

As explained earlier, the CMOS chip 710 may be coupled to a separate and independent cooling system (e.g., high temp cooling system 770) from the cooling system (e.g., low temp cooling system 750) for the qubit chip 720. In addition, the interposer 730 may be coupled to yet another independent and separate cooling system (e.g., mid temp cooling system 760). Moreover, as explained earlier with respect to FIGS. 1-6B, there are several benefits of this arrangement when separate cooling systems are coupled to the CMOS chip 710 and the qubit chip 720, respectively. Although FIG. 7 shows a certain arrangement of components, additional or fewer components may be included that are arranged differently. As an example, the CMOS chip 710 and the qubit chip 720 may be packaged using other technologies and they could be interconnected as part of the MCM 700 differently.

Figure 8:
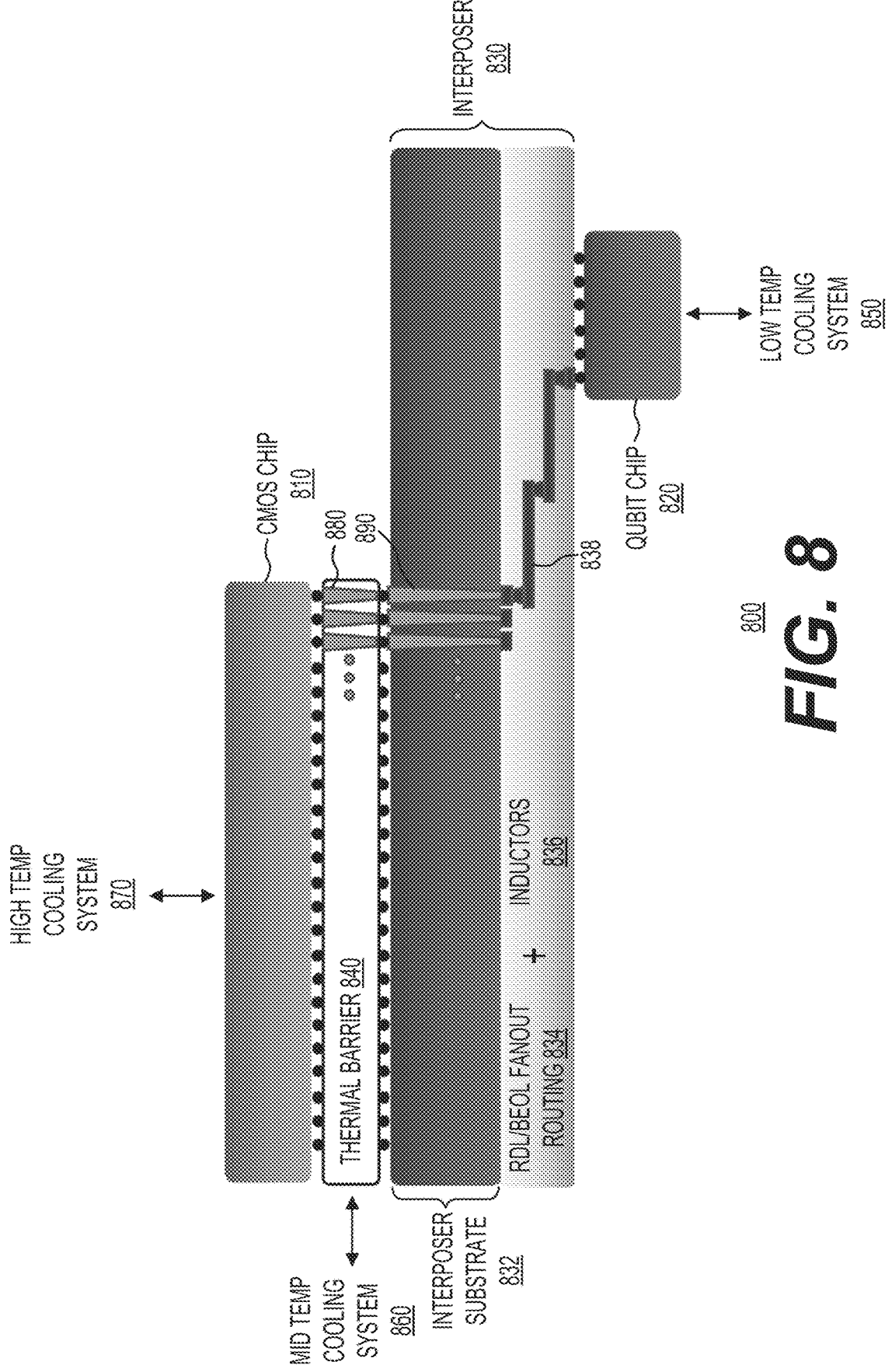
FIG. 8 shows a diagram of an example sub-kelvin control system for scalable quantum control using a thermally resistive vertical stack of a heat-dissipating device and a sensitive device.

FIG. 8 shows a diagram of an example sub-kelvin control system for scalable quantum control using a thermally resistive vertical stack 800 of a heat-dissipating device and a sensitive device. In this assembly of a packaged integrated circuit corresponding to the heat-dissipating device (e.g., CMOS chip 810) with a packaged integrated circuit corresponding to the sensitive device (e.g., qubit chip 820), the two devices are attached to the opposite side of the interposer 830. In addition, a thermal barrier 840 is arranged between the interposer 830 and the CMOS chip 810. As shown in FIG. 8, a low temp cooling system 850, a mid temp cooling system 860, and a high temp cooling system 870 are used for cooling each of the heat-dissipating device (CMOS chip 810), the sensitive device (qubit chip 820), and the thermal barrier 840. Each of the low temp cooling system 850, the mid temp cooling system 860, and the high temp cooling system 870 may comprise a dilution refrigerator, a pumped helium-3 system, or a pumped helium-4 system.

Like the CMOS chip 710 described with respect to FIG. 7, the CMOS chip 810 of FIG. 8 may be packaged as a ball-grid array package such that it can be bonded via the ball-grid array to the thermal barrier. Alternatively, die-bonding techniques such as flip-chip bump-bonding may also be used. As shown in FIG. 8, the through-silicon vias (TSVs) 880 (formed within thermal barrier 840) may be used to interconnect signals from the control circuitry within the CMOS chip 810 to the additional contacts on the bottom surface of the thermal barrier 840, which is coupled to the top surface of the interposer substrate 832. Interposer substrate 832 may further include additional TSVs 890 to interconnect signals from the contacts on the bottom surface of thermal barrier 840 to additional signal contacts within the bottom portion of the interposer 830. The bottom portion of the interposer 830 further includes a redistribution layer (RDL) and backend of the line (BEOL) routing 834. The RDL may be configured as one or more extra layers of wiring to make the chip-to-chip bonding simpler. Moreover, the bottom portion of the interposer 830 may further include inductors 836 that may be used as resonators. The signal pathways 838 may be routed onwards to the qubits in the qubit chip. Depending on the number of qubits in the qubit chip, which may require up to 10s of wires per qubit, the RDL and the BEOL processes may include a large number of layers (e.g., 50-100 layers) of metallization. The wires may be formed using niobium titanium nitride (NbTiN).

Unlike the assembly in FIG. 8, the assembly in FIG. 7 avoids the TSVs (e.g., TSVs 890 of FIG. 8) in the interposer. In addition, a smaller pitch size for the CMOS chip reduces the die size of the heat-dissipating device. As explained earlier, the CMOS chip may be coupled to a separate and independent cooling system from the cooling system for the qubit chip. In addition, the interposer may be coupled to yet another independent and separate cooling system. Moreover, as explained earlier with respect to FIGS. 1-6B, there are several benefits of this arrangement when separate cooling systems are coupled to the CMOS chip and the qubit chip, respectively. Although FIG. 8 shows a certain arrangement of components as part of a vertical stack 800, additional or fewer components may be included that are arranged differently. As an example, the CMOS chip 810 and the qubit chip 820 may be packaged using other technologies and they could be interconnected differently.

In addition, the TSVs described with respect to FIGS. 7 and 8 may be exposed by grinding or otherwise removing a layer of the encapsulant used for packaging and then using bumps or other interconnection structures to connect the chips, the thermal barrier, and the interposer. Alternative technologies, such as wafer-to-die bonding techniques, may also be used.

The sub-kelvin control system for scalable quantum control and its implementation as described with the examples above offers several advantages over conventional systems. First, the low capacitive and inductive load for active electronics (e.g., the CMOS chip) results in extremely low power operation. Second, the control circuitry incorporated in the CMOS chip has a reduced control-system latency due to the short distance for the electrical signals to travel. Third, the interconnects can be lithographically defined, which creates several advantages, including: (1) a large number of interconnects can be accommodated, which are required for interconnecting the control signals with the qubit gates, (2) the interconnects can have a small cross-sectional area, (3) the shorter length of the interconnects and the small cross-sectional area of the interconnects allows for more precise control of the parasitic inductance and parasitic capacitance, and (4) there are no external connectors or cables that impact the overall footprint of the control system, or add parasitic inductance or parasitic capacitance.

Moreover, the MCM arrangement (e.g., MCM 700) shown in FIG. 7 could scale to thousands or tens of thousands of electrical signal lines. In addition, the MCM arrangement would be easier to fabricate, and allow one to achieve good thermal insulation between the two devices easily. The vertical stack arrangement (e.g., vertical stack 800) shown in FIG. 8 could also scale to hundreds of thousands or millions of electrical signal lines. As part of such a vertical stack arrangement, 'unit cells' could be replicated in a 2D array in an almost unlimited way. The thermally insulating layer could use thermally insulating materials such as ceramics like Macor. Alternatively, phonon engineering techniques could be used to minimize phonon propagation and minimize thermal conductivity. A very large number of layers of different crystal structures could be fabricated where the interfacial thermal resistance (or Kapitza resistance) between the layers limits phonon and electron propagation and thus minimizes thermal conductivity perpendicular to the plane of the layer (and hence between the devices).

Figure 9:
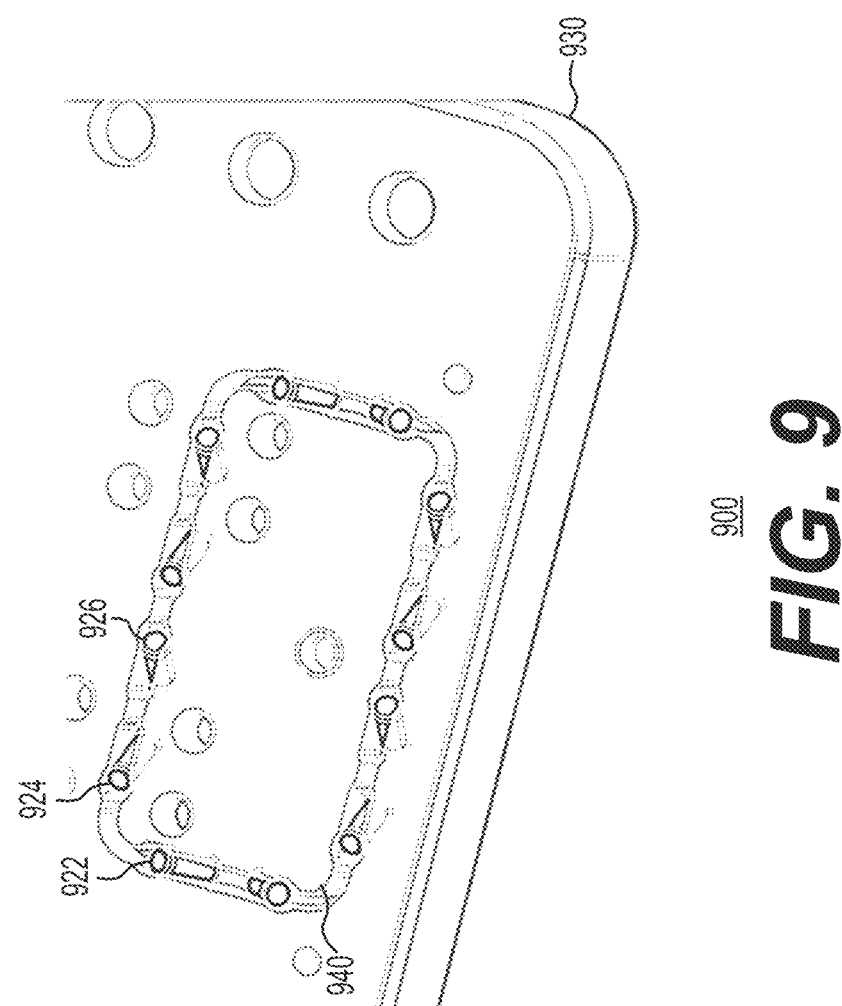
FIG. 9 shows one example of an arrangement to separate the heat-dissipating device from the sensitive device.

FIG. 9 shows one example of a mechanical arrangement 900 to separate the heat-dissipating device from the sensitive device. This example relates to a mechanical arrangement 900 of cylindrical thermal insulators (e.g., cylindrical thermal insulators 922, 924, and 926) to separate two pieces of metal (e.g., metal piece 930 and metal piece 940) over a short distance, while maintaining mechanical rigidity with precise alignment between components associated with the two or more temperature stages. This mechanical arrangement may be created by forming a ring-shaped cutout separating two pieces of metal (e.g., a single piece of copper which is cut to create two pieces of copper, or by precisely machining two separate pieces (e.g., metal piece 930 and metal piece 940)) and inserting thermally insulating cylinders 922, 924, and 926 (e.g., Macor dowels) into the holes made up of one surface from the cutout piece and another surface from the piece with the cutout, where the surfaces are cylindrical and concentric. The thermally insulating cylinders shown in FIG. 9 on the left side and the right side primarily stop the cutout metal piece 940 from moving left and right, but would also be sufficient to stop the cutout metal piece 940 from moving forwards and backwards. The thermally insulating cylinders at the front and the back stop the cutout metal piece 940 from moving backwards and forwards primarily, but would also be sufficient to stop the cutout metal piece 940 from moving left and right. Additionally, because the thermally insulating cylinders (e.g., cylindrical thermal insulators 922, 924, and 926) are arranged at a 45-degree angle with respect to the plane of the metal plane, they also prevent the cutout metal piece 940 from sliding up or down. The holes for the thermally insulating cylinders may be formed into one piece of metal prior to the subtractive process to separate into two parts, to increase the accuracy of all the surfaces relative to one another, which will result in higher accuracy of alignment between features on the resulting pieces. Alternatively, the cylindrical surfaces may be independently formed in two independently fabricated parts. The subtractive process may include milling or electrical discharge machining. Larger numbers of cylindrical insulators could be used to increase the mechanical strength of the assembly. The angles of the cylinders relative to the two pieces, and relative to each other, can be modified to increase the strength in a particular direction.

Figure 10:
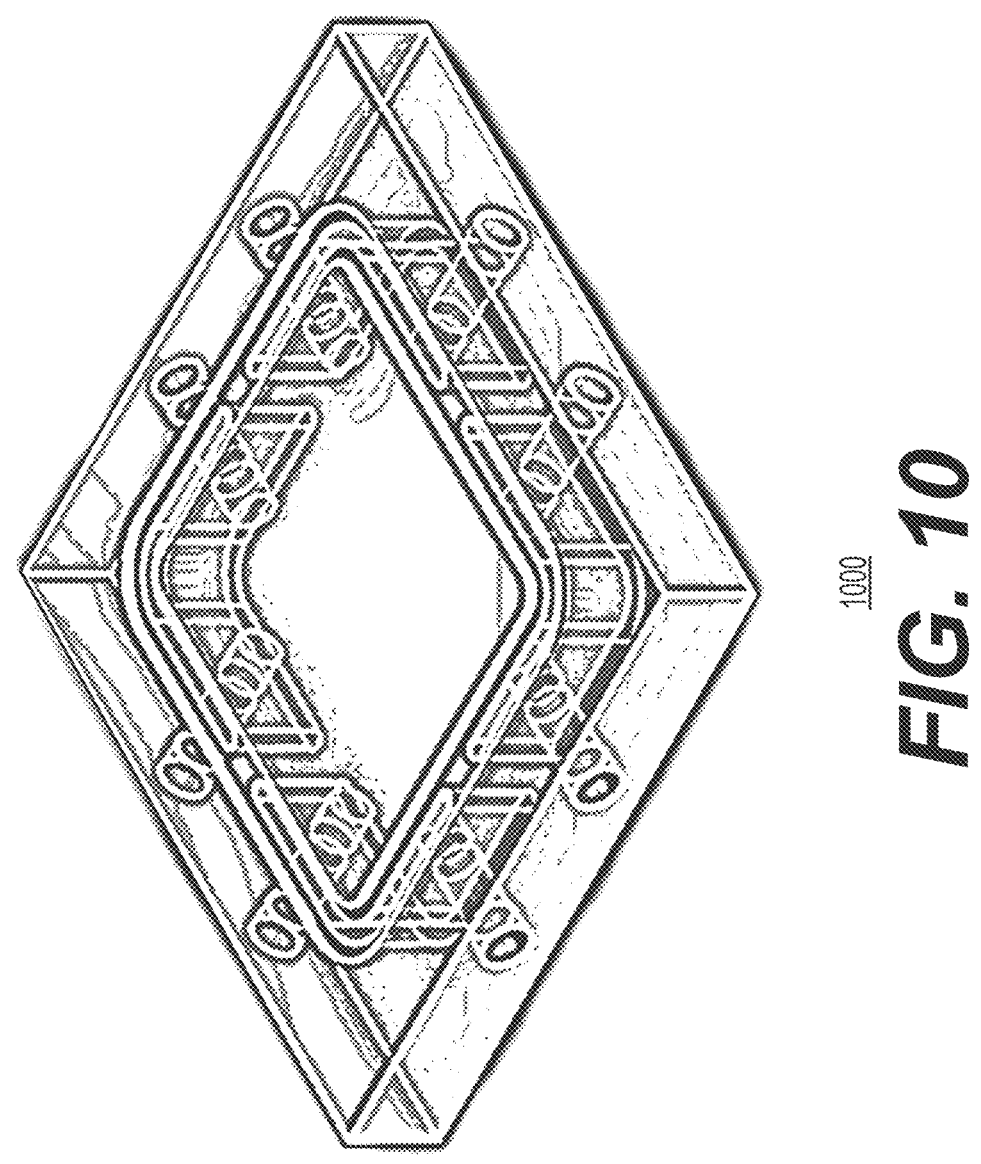
FIG. 10 shows another example of an arrangement to separate the heat-dissipating device from the sensitive device.

Advantageously, mechanical arrangement 900 is very rigid and provides precise alignment between different temperature stages. Moreover, mechanical arrangement 900 results in good planarity between the surfaces of an MCM (e.g., the arrangement shown in FIG. 7). Similarly, mechanical arrangement 900 results in precise height differences to align the different chips in a stack (e.g., the arrangement shown in FIG. 8). Other advantages relate to the low cross-sectional area for heat flow and no need for any adhesives, which are brittle and can crack when cooled to sub-kelvin temperatures. Finally, the orientation of the thermally insulating cylinders (e.g., dowels) does not interfere with the other features of the system. Although FIG. 9 shows a specific mechanical arrangement 900 including thermally insulating cylinders (e.g., dowels), other mechanical arrangements may also be used to realize some of the advantages associated with the sub-kelvin control system for scalable quantum control described herein. As an example, FIG. 10 shows another example of an arrangement 1000 to separate the heat-dissipating device from the sensitive device. In this case, there are tabs retained in the metal such that the cylinders can easily be inserted into the holes before the metal tabs are cut away to separate the parts.

In conclusion, the present disclosure relates to a system including a first cooling sub-system operable to maintain an operating temperature for a first device within a first sub-kelvin temperature range. The system may further include a second cooling sub-system, separate from the first cooling sub-system, operable to maintain an operating temperature for a second device, different from the first device, within a second sub-kelvin temperature range. The first sub-kelvin range may comprise a range between 50 milli-kelvin (mK) to 999 mK and the second sub-kelvin range may comprise a range between 1 mK to 299 mK. A combination of the first cooling sub-system and the second cooling sub-system is configured to maintain a temperature gradient between the first device and the second device despite the first device and the second device being in close proximity to each other.

Each of the first cooling sub-system and the second cooling sub-system may comprise a dilution refrigerator, a pumped helium-3 system, or a pumped helium-4 system. The first device may comprise a control chip, the second device may comprise a qubit plane, and the control chip may comprise control circuitry for controlling qubits within the qubit plane.

The system may further comprise a thermal barrier for thermally isolating the first device from the second device. A multi-chip module configuration may be used for interconnecting the first device, the second device, and the thermal barrier. Alternatively, a stacked configuration may be used for interconnecting the first device, the second device, and the thermal barrier.

The system may further comprise a mechanical arrangement of cylindrical thermal insulators for thermally isolating the first device from the second device. The cylindrical thermal insulators may be configured to separate two pieces of metal while maintaining alignment between a first set of components, including the first device, configurable to operate within the first sub-kelvin temperature range and a second set of components, including the second device, configurable to operate within the second sub-kelvin temperature range.

In another example, the present disclosure relates to a method of operating a system, including using a first cooling sub-system, maintaining an operating temperature for a first device within a first sub-kelvin temperature range. The method may further include using a second cooling sub-system, separate from the first cooling sub-system, maintaining an operating temperature for a second device, different from the first device, within a second sub-kelvin temperature range. The first sub-kelvin range may comprise a range between 50 milli-kelvin (mK) to 999 mK and the second sub-kelvin range may comprise a range between 1 mK to 299 mK. The method may further comprise using a combination of the first cooling sub-system and the second cooling sub-system, maintaining a temperature gradient between the first device and the second device despite the first device and the second device being in close proximity to each other.

Each of the first cooling sub-system and the second cooling sub-system may comprise a dilution refrigerator, a pumped helium-3 system, or a pumped helium-4 system. The first device may comprise a control chip, the second device may comprise a qubit plane, and the control chip may comprise control circuitry for controlling qubits within the qubit plane.

The method may further include thermally isolating the first device from the second device using a thermal barrier and using a third cooling sub-system, separate from the first cooling sub-system and the second cooling sub-system, maintaining an operating temperature of the thermal barrier within a third sub-kelvin temperature range between the first sub-kelvin range and the second sub-kelvin temperature range.

In yet another example, the present disclosure relates to a system including a heat-dissipating device configurable to operate within a first sub-kelvin temperature range. The system may further include a sensitive device coupled to the heat-dissipating device via an interposer, where the sensitive device is arranged in close proximity to the heat-dissipating device, and where the sensitive device is configurable to operate within a second sub-kelvin temperature range lower than the first sub-kelvin temperature range. The system may further include a first cooling sub-system coupled to the heat-dissipating device for maintaining an operating temperature within the first sub-kelvin temperature range.

The system may further include a second cooling sub-system, separate from the first cooling sub-system, coupled to the interposer for maintaining an operating temperature of the interposer within a third sub-kelvin temperature range between the first sub-kelvin range and the second sub-kelvin temperature range. The system may further include a third cooling sub-system, separate from the first cooling sub-system and the second cooling sub-system, coupled to the sensitive device for maintaining an operating temperature within the second sub-kelvin temperature range such that a combination of the first cooling sub-system, the second cooling sub-system, and the third cooling sub-system is configured to maintain a temperature gradient between the heat-dissipating device and the sensitive device despite being in close proximity to each other.

Each of the first cooling sub-system, the second cooling sub-system, and the third cooling sub-system may comprise a dilution refrigerator, a pumped helium-3 system, or a pumped helium-4 system. The heat-dissipating device may comprise a control chip, the sensitive device may comprise a qubit plane, and the control chip may comprise control circuitry for controlling qubits within the qubit plane.

The system may further comprise a thermal barrier for thermally isolating the heat-dissipating device from the sensitive device. A multi-chip module configuration may be used for interconnecting the heat-dissipating device, the sensitive device, the thermal barrier, and the interposer. Alternatively, a stacked configuration is used for interconnecting the heat-dissipating device, the sensitive device, the thermal barrier, and the interposer.

The system may further comprise a mechanical arrangement of cylindrical thermal insulators for thermally isolating the heat-dissipating device from the sensitive device. The cylindrical thermal insulators may be configured to separate two pieces of metal while maintaining alignment between a first set of components, including the heat-dissipating device, configurable to operate within the first sub-kelvin temperature range and a second set of components, including the sensitive device, configurable to operate within the second sub-kelvin temperature range.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

As an example, although the sensitive device is described as a qubit plane, the sensitive device may be any device that works only at cryogenic temperatures, such as the one described herein. Similarly, although the heat-dissipating device is described as a control chip for the qubit plane, any heat-dissipating device that is required to be in close proximity of the sensitive device can be considered a heat-dissipating device.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine. Exemplary transmission media includes coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A system comprising:
a first cooling sub-system operable to maintain an operating temperature for a first device within a first sub-kelvin temperature range;
a second cooling sub-system, separate from the first cooling sub-system, operable to maintain an operating temperature for a second device, different from the first device, within a second sub-kelvin temperature range, wherein the second device comprises a qubit plane and the first device comprises a control chip with control circuitry for controlling qubits within the qubit plane, and wherein the first sub-kelvin range comprises a range between 50 milli-kelvin (mK) to 999 mK and the second sub-kelvin range comprises a range between 1 mK to 299 mK, wherein the first device is coupled to the second device via an interposer, and wherein a thermal barrier is arranged between the first device and the interposer; and
a third cooling sub-system, separate from both the first cooling sub-system and the second cooling sub-system, coupled to the thermal barrier for maintaining an operating temperature of the interposer within a third sub-kelvin temperature range between the first sub-kelvin range and the second sub-kelvin temperature range, wherein a combination of the first cooling sub-system, the second cooling sub-system, and the third cooling sub-system is configured to maintain a temperature gradient between the first device and the second device despite the first device and the second device being in close proximity to each other as a result of a coupling via the interposer.

2. The system of claim 1, wherein each of the first cooling sub-system and the second cooling sub-system comprises a dilution refrigerator, a pumped helium-3 system, or a pumped helium-4 system.

3. The system of claim 1, wherein the thermal barrier is for thermally isolating the first device from the second device.

4. The system of claim 3, wherein a multi-chip module configuration is used for interconnecting the first device, the second device, and the thermal barrier.

5. The system of claim 3, wherein a stacked configuration is used for interconnecting the first device, the second device, and the thermal barrier.

6. The system of claim 1, further comprising a mechanical arrangement of cylindrical thermal insulators for thermally isolating the first device from the second device.

7. The system of claim 6, wherein the cylindrical thermal insulators are configured to separate two pieces of metal while maintaining alignment between a first set of components, including the first device, configurable to operate within the first sub-kelvin temperature range and a second set of components, including the second device, configurable to operate within the second sub-kelvin temperature range.

8. The system of claim 1, wherein the third cooling sub-system comprises a dilution refrigerator, a pumped helium-3 system, or a pumped helium-4 system.

9. A method of operating a system, the method comprising:
using a first cooling sub-system, maintaining an operating temperature for a first device within a first sub-kelvin temperature range;
using a second cooling sub-system, separate from the first cooling sub-system, maintaining an operating temperature for a second device, different from the first device, within a second sub-kelvin temperature range, wherein the second device comprises a qubit plane and the first device comprises a control chip with control circuitry for controlling qubits within the qubit plane, and wherein the first sub-kelvin range comprises a range between 50 milli-kelvin (mK) to 999 mK and the second sub-kelvin range comprises a range between 1 mK to 299 mK, wherein the first device is coupled to the second device via an interposer, and wherein a thermal barrier is arranged between the first device and the interposer;
using a third cooling sub-system, separate from both the first cooling sub-system and the second cooling sub-system, coupled to the thermal barrier for maintaining an operating temperature of the interposer within a third sub-kelvin temperature range between the first sub-kelvin range and the second sub-kelvin temperature range; and
wherein the method further comprises using a combination of the first cooling sub-system, the second cooling sub-system, and the third cooling sub-system maintaining a temperature gradient between the first device and the second device despite the first device and the second device being in close proximity to each other as a result of a coupling via the interposer.

10. The method of claim 9, wherein each of the first cooling sub-system and the second cooling sub-system comprises a dilution refrigerator, a pumped helium-3 system, or a pumped helium-4 system.

11. The method of claim 9, further comprising thermally isolating the first device from the second device using the thermal barrier.

12. The method of claim 9, wherein the third cooling sub-system comprises a dilution refrigerator, a pumped helium-3 system, or a pumped helium-4 system.

13. The method of claim 9, further comprising using a mechanical arrangement of cylindrical thermal insulator thermally isolating the first device from the second device, wherein the cylindrical thermal insulators are configured to separate two pieces of metal while maintaining alignment between a first set of components, including the first device, configurable to operate within the first sub-kelvin temperature range and a second set of components, including the second device, configurable to operate within the second sub-kelvin temperature range.

14. A system comprising:

a heat-dissipating device configurable to operate within a first sub-kelvin temperature range;

a sensitive device coupled to the heat-dissipating device via an interposer, wherein the sensitive device is arranged in close proximity to the heat-dissipating device, wherein the sensitive device comprises a qubit plane and the heat dissipating device comprises a control chip with control circuitry for controlling qubits within the qubit plane, and wherein the sensitive device is configurable to operate within a second sub-kelvin temperature range lower than the first sub-kelvin temperature range, wherein the sensitive device is coupled to the heat dissipating device via an interposer, and wherein a thermal barrier is arranged between the heat dissipating device and the interposer;

a first cooling sub-system coupled to the heat-dissipating device for maintaining an operating temperature within the first sub-kelvin temperature range;

a second cooling sub-system, separate from the first cooling sub-system, coupled to the interposer for maintaining an operating temperature of the interposer within a third sub-kelvin temperature range between the first sub-kelvin range and the second sub-kelvin temperature range; and a third cooling sub-system, separate from the first cooling sub-system and the second cooling sub-system, coupled to the interposer for maintaining an operating temperature within of the interposer within a third sub-kelvin temperature range between the first sub-kelvin range and the second sub-kelvin temperature range such that a combination of the first cooling sub-system, the second cooling sub-system, and the third cooling sub-system is configured to maintain a temperature gradient between the heat-dissipating device and the sensitive device despite being in close proximity to each other.

15. The system of claim 14, wherein each of the first cooling sub-system, the second cooling sub-system, and the third cooling sub-system comprises a dilution refrigerator, a pumped helium-3 system, or a pumped helium-4 system.

16. The system of claim 14, wherein the thermal barrier is for thermally isolating the heat-dissipating device from the sensitive device.

17. The system of claim 16, wherein a multi-chip module configuration is used for interconnecting the heat-dissipating device, the sensitive device, the thermal barrier, and the interposer.

18. The system of claim 16, wherein a stacked configuration is used for interconnecting the heat-dissipating device, the sensitive device, the thermal barrier, and the interposer.

19. The system of claim 14, further comprising a mechanical arrangement of cylindrical thermal insulators for thermally isolating the heat-dissipating device from the sensitive device.

20. The system of claim 19, wherein the cylindrical thermal insulators are configured to separate two pieces of metal while maintaining alignment between a first set of components, including the heat-dissipating device, configurable to operate within the first sub-kelvin temperature range and a second set of components, including the sensitive device, configurable to operate within the second sub-kelvin temperature range.

* * * * *